United States Patent [19]

Holgersson

[11] 4,391,303

[45] Jul. 5, 1983

[54] BAND-SHAPED DEVICE FOR FORMING A PIPE-SHAPED PROTECTION COVER

[75] Inventor: Stig L. Holgersson, Bredaryd, Sweden

[73] Assignee: Telefonaktiebolaget L M Ericsson, Stockholm, Sweden

[21] Appl. No.: 227,066

[22] PCT Filed: Apr. 29, 1980

[86] PCT No.: PCT/SE80/00126

§ 371 Date: Jan. 3, 1981

§ 102(e) Date: Dec. 23, 1980

[87] PCT Pub. No.: WO80/02476

PCT Pub. Date: Nov. 13, 1980

[30] Foreign Application Priority Data

May 3, 1979 [SE] Sweden ............................. 7903842

[51] Int. Cl.³ .......................................... F16L 57/00
[52] U.S. Cl. .................................. 138/166; 138/128; 138/156; 138/168; 138/149; 428/167; 174/68 C; 174/101; 138/110
[58] Field of Search ............... 138/119, 110, 128, 156, 138/157, 149, 162, 161, 166, 168; 428/36, 167; 156/204; 174/68 C, 48, 101, 97

[56] References Cited

U.S. PATENT DOCUMENTS

| D. 210,286 | 2/1968 | Venema | 138/DIG. 11 |
|---|---|---|---|
| 2,023,047 | 12/1935 | Ganoe | 138/166 |
| 2,378,272 | 6/1945 | Whitaker | 138/161 |
| 3,368,692 | 2/1968 | Voller | 156/204 X |
| 3,403,220 | 9/1968 | Riedel et al. | 138/162 X |
| 3,649,398 | 3/1972 | Keith | 138/149 X |
| 3,687,170 | 8/1972 | Malone et al. | 138/149 X |
| 3,755,031 | 8/1973 | Hoffman et al. | 428/167 X |

FOREIGN PATENT DOCUMENTS 2011205 3/1970 Fed. Rep. of Germany .

Primary Examiner—James E. Bryant, III
Attorney, Agent, or Firm—Hane, Roberts, Spiecens & Cohen

[57] ABSTRACT

An article for forming a tubular protective cover around telephone and electrical cables comprising a generally flat band of material having opposite upper and lower surfaces and end edges, one of the surfaces being planar, the other surface being provided with a plurality of spaced grooves therein. Each groove is of V-shape and has inclined sides which intersect to form an apex proximate the planar surface to form a hinge where the band can be folded to enable the band to surround a cable. The other surface of the band is relatively flat between the grooves to define a continuous planar surface. At the grooves, the band is formed with elevations projecting beyond the plane of the surface in continuation of the sides of the grooves such that with the band folded at the hinges, the elevations at the sides of the grooves approach one another to provide a stiffening effect for the folded band around the cable. Snap-lock male and female elements are respectively provided on the band at the end edges for holding the folded around the cable.

6 Claims, 3 Drawing Figures

U.S. Patent   Jul. 5, 1983   4,391,303
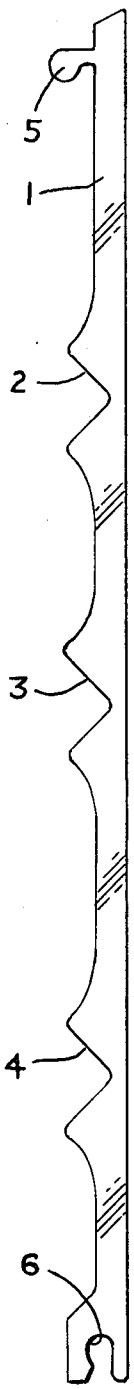
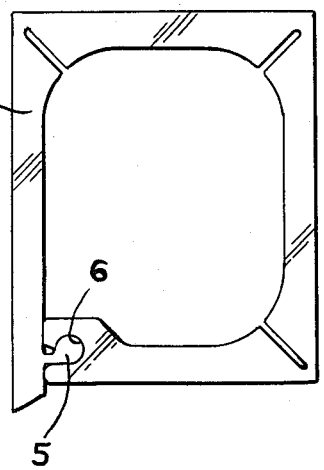
FIG. 2
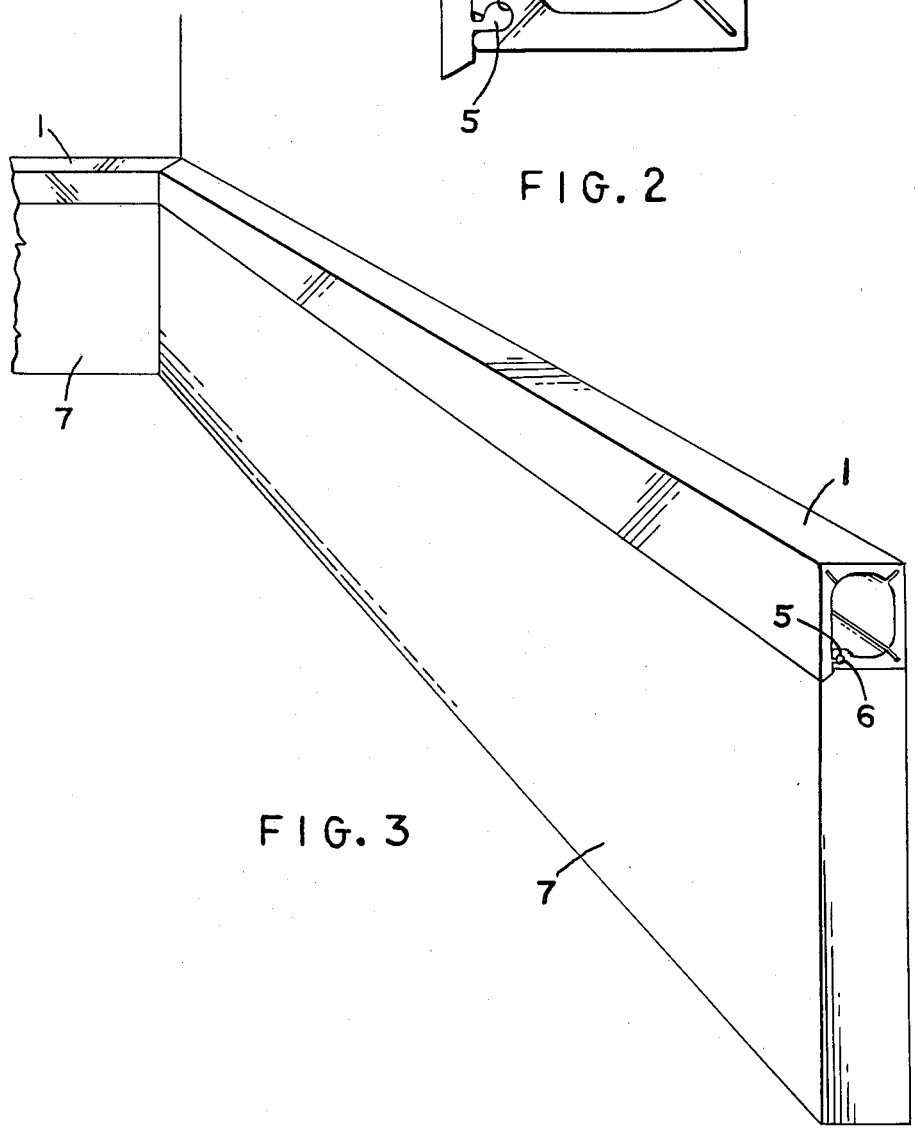
FIG. 3
FIG. 1

BAND-SHAPED DEVICE FOR FORMING A PIPE-SHAPED PROTECTION COVER

FIELD OF THE INVENTION

The present invention relates to a band-shaped device for forming a pipe-shaped protection cover for telephone and electrical cables and the like.

DESCRIPTION OF PRIOR ART

Previously known devices for forming a cover for electrical cables and the like have for different reasons not given rise to any need on the industrial market for which reason they are difficult to obtain if not completely impossible to have at hand. One of the main reasons is that the known constructions are difficult to manufacture and thus involve high production costs resulting in a high selling price. Furthermore, many known constructions intervene in existing installations which in turn implies high installation costs and frequently demands that the installation is carried out by a professional. These factors also give rise to a high expense for the known products.

SUMMARY OF THE INVENTION

One object of the present invention is to improve known devices so that they will be cheaper to manufacture and distribute and simpler to install.

According to the present invention these problems are solved by means of the device mentioned in the introduction by the fact that at least one surface of a band is provided with angular grooves, whose appices are placed near the opposite side of the band and whose opposite edges extend above the surface of said one surface, and that locking means, intended to cooperate with each other, are provided at the longitudinal side edges of the band, the angular grooves extending in parallel with the side edges.

The present invention enables manufacturing by means of extrusion of a suitable plastic material in a simple tool. Furthermore, sale of the product in a very simple package is made possible, since the profiling of one side of the band renders the manufacture of the band possible in a soft material without sacrificing the high demands for stiffness of the ready-made cover. The design of the arrangement according to the present invention also renders a very simple application of it possible in existing installations, for example, on top of an existing skirting or the like.

BRIEF DESCRIPTION OF THE DRAWINGS

FIG. 1 shows, on enlarged scale, a side view of one embodiment of a device according to the present invention.

FIG. 2 is a side view of the device shown in FIG. 1 after forming is as a cover.

FIG. 3 is a schematic perspective view of an installation with a device according to FIGS. 1 and 2.

DETAILED DESCRIPTION

The device shown in the drawings according to the present invention is manufactured as a band 1 (FIG. 1) having one surface which is plain and whose other surface is profiled and has three angular grooves 2, 3, 4 and a male-shaped snap-lock element 5 at one of the edges and a female-shaped snap-lock element 6 at the other edge. Each apex of the angular grooves 2, 3 and 4 is located near the plain surface of the band 1 and since the band is made of a soft plastic material the material part at the apex can be considered to form a thin hinge. The sides of the angular grooves 2, 3 and 4 extend above the surface of the band 1 in which the grooves are formed and form elevations on each side of the angular grooves 2, 3 and 4. In the present embodiment of the invention, the angle between the sides in the angular grooves 2, 3 and 4 is approximately 90°.

The male-shaped snap-lock element 5 has a conventional design and is placed inwards of the slightly bevelled side edge of the band 1, while the female-shaped snap-lock element 6 is arranged in the other side edge of the band 1.

It will furthermore be pointed out that the angular grooves 2, 3 and 4 extend parallel to the longitudinal side edges of the band 1.

In order to form a pipe-shaped protection cover of the device as described above according to the present invention, the band 1 is folded for closing the angular grooves 2, 3 and 4 as will be described more in detail in FIG. 2 and the male-shaped snap-lock element 5 is snapped into the female-shaped shap-lock element 6. As it appears from FIG. 2, the sides in the angular grooves 2, 3 and 4 will almost be in contact with each other whereby the elevations on each side of the angular grooves 2, 3 and 4 will have a stiffening effect on the pipe-shaped protection cover shown in FIGS. 2 and 3.

In FIG. 3 a cover according to the present invention is shown applied on a skirting 7. As it appears from FIG. 2, a square and pipe-shaped protection cover is formed and as it appears from FIG. 3, one of the side surfaces is placed on the upper side of the skirting 7 and can be fastened to the skirting 7 by means of a suitable fastening means, for example, glue, staples, nails or the like. In the cover fastened on the skirting 7, electrical cables, telephone cables or the like can be placed and by slitting the cover 1 by means of a knife, an outlet for an electrical cable can be placed anywhere along the skirting.

A cover according to the present invention can be opened any time after closing and it is very easy to make changes in the placing of electrical cables and telephone cables without such changes producing ugly marks in the installation.

As it appears from FIG. 2, the side edge of the band extending beyond the male-shaped snap-lock element 5 will form a grip. The grip facilitates opening and closing the cover according to the present invention.

Furthermore, it will be pointed out that the location shown in FIG. 3 is not necessary but anyone of the plain side surfaces of the cover can be placed against the skirting 7.

The band 1 according to the present invention is extremely simple to manufacture of a suitable plastic material by extrusion in a very simple tool. The plastic material can be chosen so that the ready-made band 1 will be soft and can be reeled and sold in coils whereby the packages will be extremely simple and cheap. The design of the angular grooves 2, 3 and 4 makes the mounted cover according to FIGS. 2 and 3 extremely stiff and permanent in shape in spite of the fact that it is made of a soft plastic material. It is an extremely great advantage to be able to reel the band according to the present invention and to sell it in coils of a determined length or in coils intended to be in arbitrary lengths.

What I claim is:

1. An article for forming a tubular, protective cover around a cable, said article comprising a generally flat band of material having opposite upper and lower surfaces and end edges, one of said surfaces being planar, the other surface being provided with a plurality of spaced grooves extending parallel to said end edges, each groove having inclined sides which intersect to form an apex proximate said one planar surface to form a hinge thereat where said band can be folded to enable the band to surround a cable, said other surface of said band being relatively flat between said grooves to define a continuous planar surface, said band including elevations projecting beyond the plane of said other surface in continuation of said sides of said grooves on both sides of each groove such that with the band folded at the hinges, the elevations at the both sides of the respective grooves approach one another to provide a stiffening effect for the folded band around the cable, and locking means on said band on said band proximate said end edges for holding the folded band around the cable, said material of the band being a soft, extruded plastic, the configuration of said grooves and said elevations being such to enable said band to be wound into a roll.

2. An article as claimed in claim 1 wherein said sides of said grooves form an angle at each groove such that said sides come into contact with one another when the locking means is engaged to hold the band around the cable.

3. An article as claimed in claim 1 wherein said locking means comprises male and female snap-lock elements, said female snap-lock element being constituted as a groove provided in one of said end edges, said male snap-lock element comprising a projecting element on said other surface of a shape corresponding to said female groove for snap-lock engagement therewith, said projecting element being spaced from the other of said end edges such that with the male and female elements engaged, the portion of said band between said male element and said other end edge forms a grip position for opening and closing the cover.

4. An article as claimed in claim 1 wherein said grooves are three in number and are arranged to form a square cross-section for the cover when the locking means is engaged.

5. An article as claimed in claim 4 wherein the angle between the sides of the grooves is about 90°.

6. An article as claimed in claim 1 wherein said elevations at said grooves are of V-shape.

* * * * *